United States Patent
Levy

(10) Patent No.: US 8,650,934 B1
(45) Date of Patent: Feb. 18, 2014

(54) TESTING SYSTEM FOR CONNECTORS

(75) Inventor: David Levy, Broussard, LA (US)

(73) Assignee: Petrotechnologies, Inc., Broussard, LA (US)

( * ) Notice: Subject to any disclaimer, the term of this patent is extended or adjusted under 35 U.S.C. 154(b) by 551 days.

(21) Appl. No.: 12/700,390

(22) Filed: Feb. 4, 2010

Related U.S. Application Data

(63) Continuation-in-part of application No. 11/766,541, filed on Jun. 21, 2007, now Pat. No. 7,784,838, and a continuation-in-part of application No. 12/248,558, filed on Oct. 9, 2008, now Pat. No. 8,037,933.

(51) Int. Cl.
*G01M 3/28* (2006.01)

(52) U.S. Cl.
USPC .............................. 73/40.5 R; 73/46; 73/49.1

(58) Field of Classification Search
USPC ................. 73/40.5, 46, 49.1, 40.5 R
See application file for complete search history.

(56) References Cited

U.S. PATENT DOCUMENTS

| | | | | |
|---|---|---|---|---|
| 3,987,663 | A * | 10/1976 | Repella | 73/46 |
| 5,509,727 | A * | 4/1996 | Hart et al. | 303/3 |
| 5,833,490 | A | 11/1998 | Bouldin | |
| 6,056,327 | A | 5/2000 | Bouldin et al. | |
| 6,269,683 | B1 | 8/2001 | Jackson | |
| 6,981,422 | B1 * | 1/2006 | Comardo | 73/756 |
| 7,219,736 | B1 | 5/2007 | Levy | |
| 7,614,447 | B2 * | 11/2009 | Jennings | 166/84.1 |
| 2007/0096465 | A1 | 5/2007 | Hall et al. | |

* cited by examiner

*Primary Examiner* — Hezron E Williams
*Assistant Examiner* — Paul West
(74) *Attorney, Agent, or Firm* — Buskop Law Group, P.C.; Wendy Buskop

(57) ABSTRACT

A testing system for connectors usable with oil or natural gas wells using a test part connector and a control component connector. The system uses a test fluid in a test reservoir that is pumped to each connector simultaneously and using a test part pressure transducer and a control component pressure transducer to create a test response and a control response. The responses are then transmitted to a processor, which then compares the responses and presents compared results on a display, through a network and transmitted to a client device of a user.

22 Claims, 3 Drawing Sheets

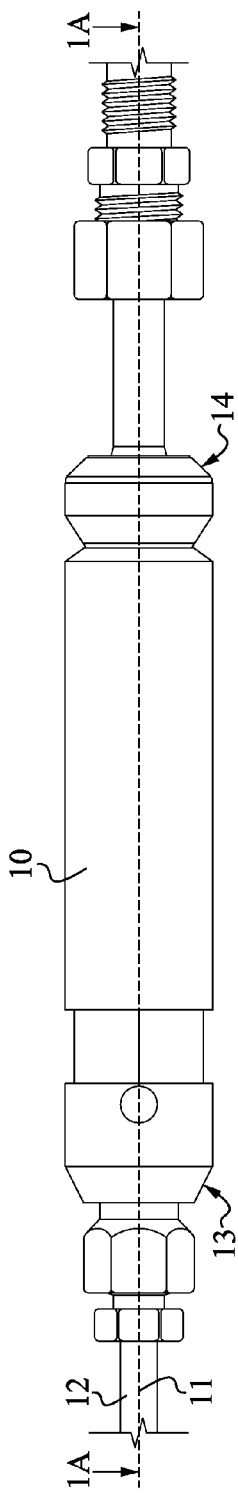
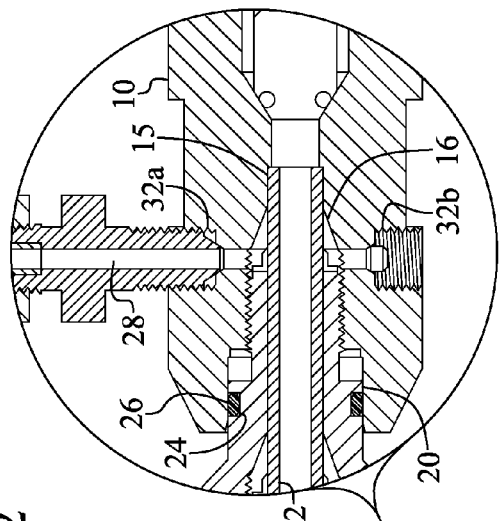
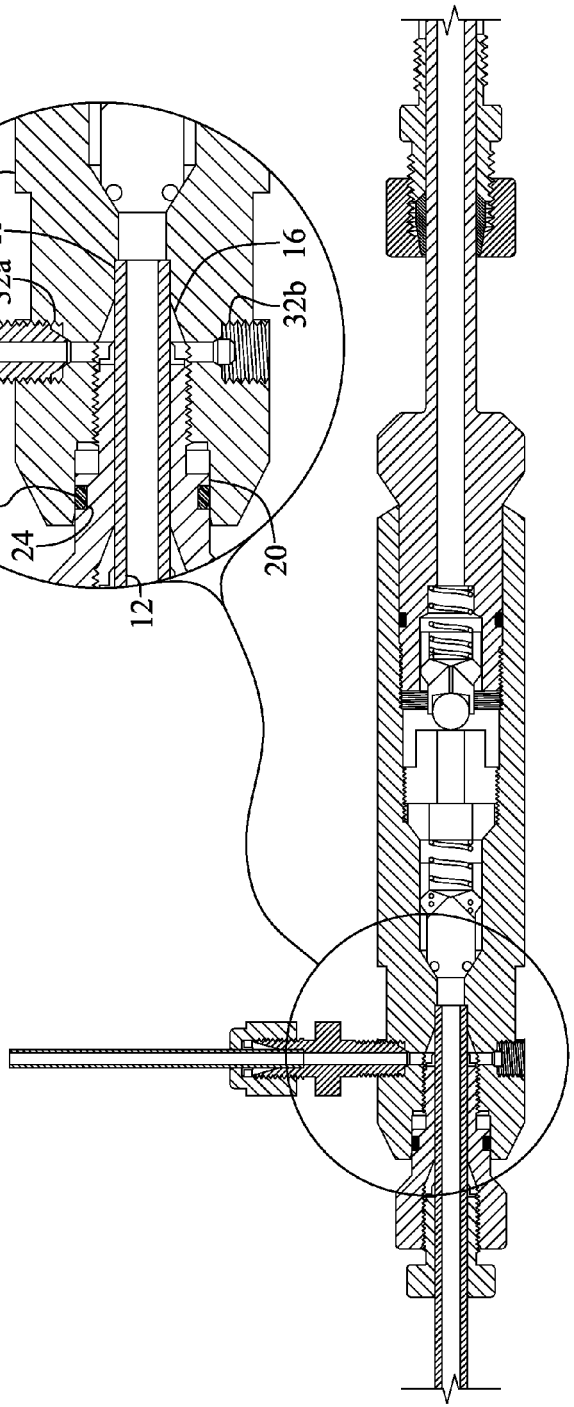
FIGURE 1
FIGURE 2

US 8,650,934 B1

TESTING SYSTEM FOR CONNECTORS

FIELD

The present application is a continuation in part of U.S. patent application Ser. No. 11/766,541 filed on Jun. 21, 2007, entitled "High Pressure Energizable Tube Connector for a Well and Method of Energizing the Connector" and is also a continuation in part of U.S. patent application Ser. No. 12/248,558 filed on Oct. 9, 2008, entitled "Externally Testable Redundant Seal Connector". These applications are incorporated in their entirety.

FIELD

The present embodiments generally relate to a testing system for connectors, such as seal connectors and high pressure energizable tube connectors, for a well.

BACKGROUND

A need exists for quick testing system for connectors, which provides results in less than about 5 minutes concerning very small leaks, such as leaks less than $1 \times 10^{(-6)}$ cm$^3$, that is highly reliable easy to use, and requires little or no training to conduct.

A further need exists for a testing system that is robust, and can withstand field tests in sandy locations or hot locations with high accuracy.

The present embodiments meet these needs.

BRIEF DESCRIPTION OF THE DRAWINGS

The detailed description will be better understood in conjunction with the accompanying drawings as follows:

FIG. 1 depicts a top view of an embodiment of a connector for testing.

FIG. 2 depicts a cut view of an embodiment of the connector of FIG. 1 along 1A.

Figure 3:
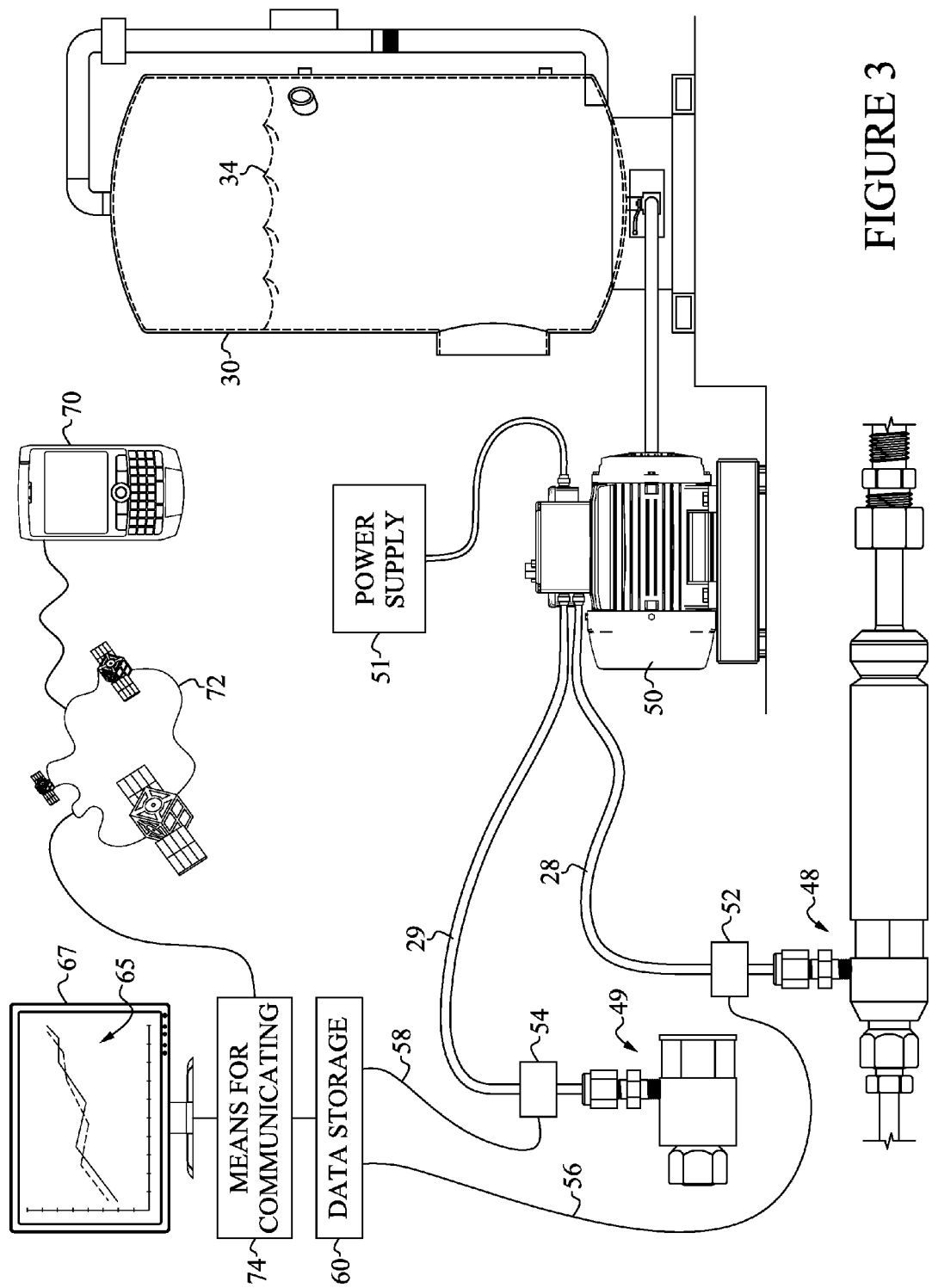
FIG. 3 depicts a networkable testing system.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to testing systems for connectors. The connectors can be testable seal connectors, which can be external and redundant, and high pressure energizable tube connectors, such as one for a well.

The well can be an oil well, a water well, a steam injection well, an injection well or a similar well. It can be used in a subsea well or a land based well.

The present embodiments can further relate to a connector for a well that has a connector body with a thru-bore for flowing fluid down a well from the surface.

The connector body can be threadable with a mandrel to support a check valve, a down hole pressure gauge, a down hole temperature gauge, a gas lift valve, or other down hole tools.

The connector body can be made of steel alloy, nickel alloy, carbon steel, other steel or combinations thereof. It can also be contemplated that the connector body can be coated to reduce friction on the threads.

The connector can include a ferrule disposed on an end of the connector body. The ferrule can be adapted to slidably engage the outer diameter of the connector body to form a primary seal between the mandrel and an annulus of the well.

The primary seal can be formed by deforming the ferrule using compression with the mandrel. Usable ferrules can be purchased from PetroTechnologies, Inc., of Broussard, La., such as part no. 120M005A.

A first sealing groove can be formed on the outer diameter of the connector body. More than one sealing groove can be used with accompanying sealing means if desired. The groove can be about 0.07 inches in depth and can be formed of a design that can support an o-ring sealing device, with rounded corners.

At least one first sealing means can be disposed in at least one sealing groove. It is possible that a second or back up o-ring can be used in the sealing groove to increase the compression on the o-ring so that no gas flows out of the connector.

At least one test conduit can be formed in the connector body, which can further be in parallel to, but disconnected from, the thru-bore and can be parallel to the body axis. It is contemplated that the test conduit does not have to be parallel to the body axis. The test conduit can be placed at an angle to the body axis in the connector body. The test conduit can comprise a test conduit diameter ranging from about 0.015 inches to about 0.125 inches.

A test port can be disposed in the connector body for receiving a test fluid, and introducing the test fluid to at least one test conduit. The test port can have a test port diameter ranging from about 0.015625 inches to about 0.5 inches. The test port can be cylindrical with a tapered metal to metal seal at one end. It can also be contemplated that the test port can have a threaded engagement for receiving a test plug. The test port can include a removable and re-installable test port plug. The test port can include an access hole having a diameter ranging from about $\frac{1}{32}$ inches to about $\frac{1}{16}$ inches.

The testing system externally tests a connector for a fluid conduit to determine leak rates which are less than $1 \times 10^{(-6)}$ cm$^3$ within 5 minutes.

The testing system can use at least one test part connector and a control component connector for testing in tandem simultaneously.

The test system can use a test fluid from a test reservoir and a pump for pumping the test fluid from the test reservoir to the test part connector and the control component connector simultaneously at similar pressures.

The similar pressures do not have to be identical pressures, but can be identical pressures in an embodiment. A computer program can permit a user to test at two different pressures in the test part and the control component, and then adjust the pressures to provide a "normal" pressure for correct and highly accurate comparison purposes between the test part and the control component. The variation in pressures and test response over time can be translated to a volume using a simple mathematical conversion known to those ordinarily skilled in the art to detect leaks as small as $10^{-6}$ cm$^3$ over a five minute period.

A test part pressure transducer and a control component pressure transducer can be used in the testing system. The test part pressure transducer can detect and transmit a test response when a first portion of test fluid is pumped to the test part simultaneously with the control component pressure transducer for detecting and transmitting a control response when a second portion of test fluid is pumped to the control component connector.

In an embodiment of the testing system, the first portion of test fluid is independently pumped and pressured from the second portion of test fluid.

The testing system uses a data storage that is in communication with the test part pressure transducer and control component pressure transducer. The data storage records the test response and control response.

The testing system can use a means for communicating with the data storage, such as a cell phone, a laptop, a computer monitor, which uses computer instructions in the data storage for comparing the test response and the control response. The means for communicating can then form "compared results" and present the "compared results" to a user within 5 minutes of pumping the test fluid to the test part connector and the control component connector. The means for communicating and presenting the compared results does not use (or need to use) a mathematical model of o-ring extrusion which is a complicated formula that can take time to run and computer. The means for communicating does not use (or need to use) a mathematical model representing a contraction of the test fluid in the test part due to the cooling of the test fluid during pumping.

It can be contemplated that one or more test ports can receive the test fluid.

The test fluid can be water, compressed air, oil, compressed nitrogen, compressed helium, another compressed inert gas or combinations thereof.

In an embodiment, the test fluid can be at a pressure from about 1 atm to about 40,000 psi.

The test pump can be a small hand pump, an ENERPAC pump or any pump capable of flowing from about 1 milliliter to about 10 milliliters of gas or fluid into the test conduit and can also be adapted to reach a test pressure from about 1000 psi to about 20000 psi.

It can be contemplated that the test plug can be removed for testing and re-installed into the test port upon completion of testing. Each test plug can form a secondary seal between the annulus of the well and the thru-bore of the connector.

In an embodiment of the testing system, the data storage can contain computer instructions for enabling a processor or the means for communicating to provide a "pass" response to the user when the test part response is within 10 percent of the control component response. The "pass" response would mean the part passes the test, and that it is within the desired tolerances. Although the tolerances can be within 10 percent, a user can adjust the tolerances to smaller numbers and as low as 0.1 percent.

The data storage can also contain computer instructions for enabling the means for communicating, which can be a processor, to provide a green screen as a response for the user when the test part response is within up to 10 percent of the control component response. The term "green screen" refers to using a version of the actual color green on the entire screen for a user to quickly see that the test part "passes" the test. Similarly, a red screen meaning the test part fails the test can be used.

The testing system can include computer instructions in the data storage for enabling the means for communicating to provide a screen color other than green as a response for the user when the test part response deviates more than 10 percent from the control component response. The color can be pink, blue, striped, have shapes and/or icons, can use blinking or other visible warning indicators on pass or fail for the test.

The testing system can include the step of presenting the compared results to a user on a client device. The compared results can be transmitted by the means for communicating to a network which can be in communication with the client device.

The client device can be a cell phone, a laptop, a desk computer, a personal digital assistant, a global positioning system "GPS" with monitoring display and processor, or similar device with a processor that can be connectable to the network. The network can be a cellular network a satellite network, a local area network, a global positioning system network or even the Internet™.

In an embodiment, the testing system can use an electric pump, and the electric pump can then be connected to a power supply such as batteries, or a 110 volt supply from a generator.

Referring now to the Figures, FIG. 1 shows a connector having a connector body 10, a connector body axis 11 and a thru-bore 12. The thru-bore can have a diameter ranging from about 0.1 inches to about 1.5 inches.

The thru-bore can pass methanol, a hydrate inhibitor or paraffin inhibitor, a hydraulic fluid to operate a valve, or a fluid to operate a sliding sleeve. The fluid passing though the thru-bore can flow at up to about 10 gallons per minute. The thru-bore fluid pressure can be used to monitor pressure inside the production tubing, inside the mandrel, or inside the well.

In an embodiment, fluid can be pumped into the connector or the connector can be screwed to a gauge to read the surrounding pressure of fluid in the well.

The connector body 10 can have a first connector end 13 and a second connector end 14 opposite the first end. The connector body can have a diameter ranging from about 0.5 inches to about 2 inches and can have a length of from about 0.5 inches to about 5 inches.

FIG. 2 shows a cut view of a ferrule 16 disposed on the first connector end 13 of the connector body 10. The ferrule can be made a high nickel alloy ferrule to prevent corrosion. The ferrule can form a primary seal 15 between the outer diameter of the connector body 10 and a profile 20 in a mandrel 22. The primary seal can prevent fluid of the thru-bore from reaching the fluid of the annulus.

A first sealing groove 24 can be formed on the outer diameter of the connector body 10 and at least one first sealing means 26 can be disposed in the first sealing groove 24. The first sealing means can be an o-ring, an energizable rotatable flexible metal seal, a metal to metal seal or combinations thereof.

A test conduit 28 can be formed in the connector body 10 and can be adjacent to the thru-bore 12. The test conduit can be straight, curved or other patterns as well.

While FIG. 2 depicts one test conduit 28, it can contemplated that more than one test conduit can be formed in the connector body 10.

In this Figure, two test ports 32a, 32b are also shown and can be disposed in the connector body 10 for receiving a test fluid 34, which can be seen in FIG. 3. It can be contemplated that only one test port is used. It can further be contemplated that more then one test port can be used.

In an embodiment, a test plug can be used with the system and can be removed for testing and re-installed into the test port upon completion of testing.

FIG. 3 depicts the networkable testing system in connection with the connector.

Each test port 32a, 32b can receive test fluid 34 from a test reservoir 30, or a secondary source. It is contemplated that the test fluid 34 can be water, compressed air, oil, compressed nitrogen, compressed helium, another compressed inert gas or combinations thereof.

A pump 50 can pump the test fluid from the test reservoir 30 to the test part connector 48 and the control component connector 49 simultaneously at similar pressure though the test conduit 28 and the control conduit 29.

The pump can further be powered by a power supply 51. The power supply can be batteries, a 110 volt supply from a generator, or an additional power supply The test fluid can be introduced to at least one of the test conduits for testing using the pump, wherein the pump pressures are up to about 20,000 psi.

The test fluid 34 is passed through the test part pressure transducer 52 and the control component pressure transducer 54. The test part pressure transducer 52 detects and transmits a test response 56 when a first portion of the test fluid is pumped to the test part connector 48 simultaneously with the control component pressure transducer 54 detecting and transmitting a control response 58 when a second portion of the test fluid is pumped to the control component connector 49. The first portion of the test fluid is independently pumped and pressured from the second portion of the test fluid.

FIG. 3 also shows data storage in communication with the test part pressure transducer 52 and control component pressure transducer 54 with computer instructions for recording the test response 56 and control response 58.

The compared results 65 are then presented on a compared results display 67 to a user on a client device 70. The compared results 65 can be transmitted by the means for communicating 74 to a network 72, which can be in communication with the client device 70.

Once testing is complete, a test plug can be inserted into each of the test ports on the connector body. Each test plug can form a secondary seal.

Figure 4:
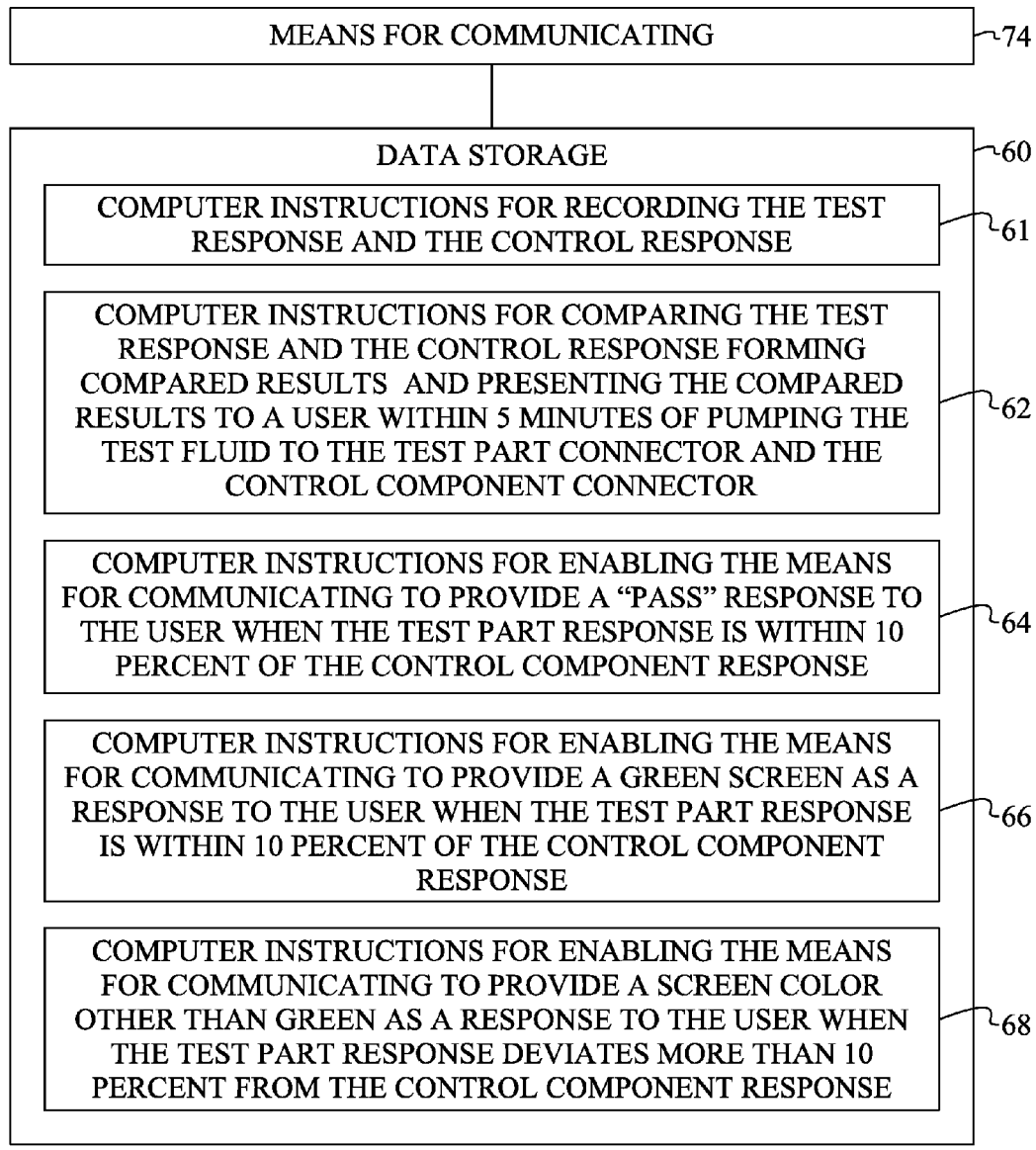
FIG. 4 depicts computer instructions which can be used in the system.

FIG. 4 shows computer instructions for recording the test response and the control response 61, which is depicted in the data storage 60, which is also shown in communication with the means for communicating 74.

The system can also include computer instructions for comparing the test response and the control response forming compared results and presenting the compared results to a user within 5 minutes of pumping the test fluid to the test part connector and the control component connector 62.

The system can include computer instructions in the data storage for enabling the means for communicating to provide a "pass" response to the user when the test part response is within 10 percent of the control component response 64.

The system can include computer instructions in the data storage for enabling the means for communicating to provide a green screen as a response to the user when the test part response is within 10 percent of the control component response 66.

The system can also include computer instructions in the data storage for enabling the means for communicating to provide a screen color other than green as a response to the user when the test part response deviates more than 10 percent from the control component response 68.

While these embodiments have been described with emphasis on the embodiments, it should be understood that within the scope of the appended claims, the embodiments might be practiced other than as specifically described herein.

What is claimed is:

1. A system for externally testing connector for a fluid conduit to determine leak rates which are less than $1 \times 10^{(-6)}$ cm$^3$ within 5 minutes comprising:

a. at least one test part connector, wherein the test part connector is disposed in a well, and a control component connector, wherein the control component connector is at a surface, and wherein the test part connector and the control component connector are tested in tandem simultaneously, wherein each connector comprises:
 i. a connector body having a thru-bore comprising a first connector end and a second connector end and a connector body axis;
 ii. a ferrule disposed on the first connector end of the connector body, wherein the ferrule is adapted for forming a primary seal between an outer diameter of the connector body and a profile in a mandrel;
 iii. at least a first sealing groove formed on the outer diameter of the connector body;
 iv. at least one first sealing means disposed in the at least one first sealing groove;
 v. at least one test conduit formed in the connector body adjacent to the ferrule and disconnected from the thru-bore;
 vi. at least one test port disposed in the connector body for receiving test fluid and introducing test fluid to one of the at least one test conduit; and
 vii. a test plug insertable in each test port upon completion of testing, wherein each test plug forms a secondary seal between the connector body and the mandrel;
b. a test fluid in a test reservoir;
c. a pump for pumping the test fluid from the test reservoir to the test part connector and the control component connector simultaneously, wherein the pump is in fluid communication with the test part connector by a first conduit, and the pump is in fluid communication with the control component connector via a second conduit, configuring the system to simultaneously test at two different pressures and compare pressures in the test part connector and the control component connector to determine leaks as small as $10^{-6}$ cm$^3$ over a five minute period;
d. a test part pressure transducer and a control component pressure transducer, wherein the test part pressure transducer detects and transmits a test response when a first portion of the test fluid is pumped to the test part connector simultaneously with the control component pressure transducer detecting and transmitting a control response when a second portion of the test fluid is pumped to the control component connector, and wherein the first portion of the test fluid is independently pumped and pressured from the second portion of the test fluid;
e. a data storage in communication with the test part pressure transducer and control component pressure transducer with computer instructions for recording the test response and control response; and
f. means for communicating with the data storage using computer instructions in the data storage for comparing the test response and the control response forming compared results and presenting the compared results to the user within 5 minutes of pumping the test fluid to the test part connector and the control component connector without using a mathematical model of o-ring extrusion and without using a mathematical model representing a contraction of the test fluid in the test part due to the cooling of the test fluid during pumping.

2. The system of claim 1, further comprising computer instructions in the data storage for enabling the means for communicating to provide a "pass" response to the user when the test part response is within 10 percent of the control component response.

3. The system of claim 2, further comprising computer instructions in the data storage for enabling the means for communicating to provide a green screen as a response to the user when the test part response is within 10 percent of the control component response.

4. The system of claim 2, further comprising computer instructions in the data storage for enabling the means for communicating to provide a screen color other than green as a response to the user when the test part response deviates more than 10 percent from the control component response.

5. The system of claim 1, wherein the compared results are presented to the user on a client device.

6. The system of claim 5, wherein the client device is a cell phone, a laptop, a desk computer, a personal digital assistant, a global positioning system "GPS" with monitoring display and processor, or similar device with processor that is connectable to a network.

7. The system of claim 1, wherein the connector body comprises an outer diameter ranging from 0.50 inches to 2 inches.

8. The system of claim 1, wherein the connector body comprises steel alloy, nickel alloy, carbon steel, other steel, or combinations thereof.

9. The system of claim 1, wherein the thru-bore has a diameter ranging from 0.1 inches to 1.5 inches.

10. The system of claim 1, wherein the connector body is threadable with the mandrel to support a check valve, a down hole pressure gauge, a down hole temperature gauge, a gas lift valve, or other down hole tools.

11. The system of claim 1, wherein the connector body is from 0.5 inches to 5 inches in length.

12. The system of claim 1, wherein the ferrule slidingly engages the outer diameter of the connector body and forms the primary seal between the mandrel and an annulus of the well.

13. The system of claim 1, wherein the test port flows the test fluid from a secondary source to the test conduit.

14. The system of claim 13, wherein the test fluid is selected from the group consisting of: water, compressed air, oil, compressed nitrogen, compressed helium, and another compressed inert gas.

15. The system of claim 14, wherein the test fluid is at a pressure from 1 atm to 40,000 psi.

16. The system of claim 1, wherein the test conduit comprises a test conduit diameter ranging from 0.015 inches to 0.125 inches.

17. The system of claim 1, wherein the at least one first sealing means is at least one o-ring.

18. The system of claim 1, wherein the at least one first sealing means is at least one energizable rotatable flexible metal seal.

19. The system of claim 1, wherein the at least one first sealing means is a metal to metal seal.

20. The system of claim 1, wherein the test plug is removable and re-installable.

21. The system of claim 1, wherein the pump is connected to a power supply.

22. The system of claim 1, wherein the similar pressures of the test fluid to the test part connector and the pressure to the control component connector are identical.

* * * * *